United States Patent [19]

Blanchard

[11] Patent Number: 5,355,782
[45] Date of Patent: Oct. 18, 1994

[54] SMOKE GENERATOR FOR FOOD SMOKING KILNS

[75] Inventor: John P. Blanchard, 33 Second Court, R.R. 2, Truro, Canada

[73] Assignee: John P. Blanchard, Truro, Canada

[21] Appl. No.: 979,862

[22] PCT Filed: Aug. 19, 1991

[86] PCT No.: PCT/CA91/00287
§ 371 Date: Feb. 18, 1993
§ 102(e) Date: Feb. 18, 1993

[87] PCT Pub. No.: WO92/03057
PCT Pub. Date: Mar. 5, 1992

[30] Foreign Application Priority Data
Aug. 22, 1990 [GB] United Kingdom ............... 9018472.2

[51] Int. Cl.[5] .................. F23B 1/32; F23K 3/00
[52] U.S. Cl. .......................... 99/482; 99/467; 110/102; 110/118; 126/59.5
[58] Field of Search ............... 99/467, 476, 482, 481; 110/102, 115, 116, 118; 126/59.5; 222/486; 426/314

[56] References Cited

U.S. PATENT DOCUMENTS

| | | | |
|---|---|---|---|
| 974,322 | 11/1910 | Wells | 110/118 |
| 2,515,455 | 7/1950 | Lipton | 110/102 |
| 2,977,954 | 4/1961 | Rigali | 126/59.5 |
| 3,809,056 | 5/1974 | Snelling | 99/476 |
| 4,270,464 | 6/1981 | Kerres | 110/102 |
| 4,282,113 | 8/1981 | Kiley | 126/59.5 |
| 4,289,079 | 9/1981 | Swistun | 110/102 |
| 4,300,456 | 11/1981 | Messersmith | 110/102 |
| 4,436,100 | 3/1984 | Green, Jr. | 110/118 |
| 4,598,649 | 7/1986 | Eshleman | 110/118 |
| 5,010,872 | 4/1991 | Kish et al. | 126/59.5 |

FOREIGN PATENT DOCUMENTS

| | | | |
|---|---|---|---|
| 3247242 | 7/1983 | Fed. Rep. of Germany | 110/102 |
| 1738208 | 6/1992 | U.S.S.R. | 99/482 |

*Primary Examiner*—Timothy F. Simone
*Attorney, Agent, or Firm*—R. Craig Armstrong

[57] ABSTRACT

The smoke generator produces smoke from combustible matter, such as sawdust or particulated wood, under a controlled set of smoke generation parameters which can be varied over a range of operating set-points. The pyrolysis and partial combustion phases of smoke generation are physically separated and are independently controlled. A controlled rate of sawdust or other combustible matter is fed into an air-excluded pyrolysis chamber in which the pyrolysis temperature is controlled by means of an adjustable power supply to a heating element in the pyrolysis chamber. The ash remaining after pyrolysis of the combustible matter is continuously removed from the pyrolysis chamber. Pyrolytic gases generated by thermal destruction of combustible matter in the pyrolysis chamber are removed to a second chamber where a controlled rate of air is injected with the hot pyrolytic gases to achieve a desired level of partial combustion. The air supply is metered and is preheated to a desired temperature by an adjustable power heater element prior to injection into the partial combustion chamber. Thus, a concentrated smoke at elevated temperature is produced in the partial combustion chamber. A heat exchange apparatus is attached to the smoke outlet from the smoke generator to cool the hot smoke gases by mechanical heat exchange rather than by dilution with ambient room temperature air. Cooling the concentrated smoke gases to ambient temperature by this means quenches further combustion reactions of the concentrated smoke which can then be delivered and utilized in a food smoking kiln.

10 Claims, 10 Drawing Sheets

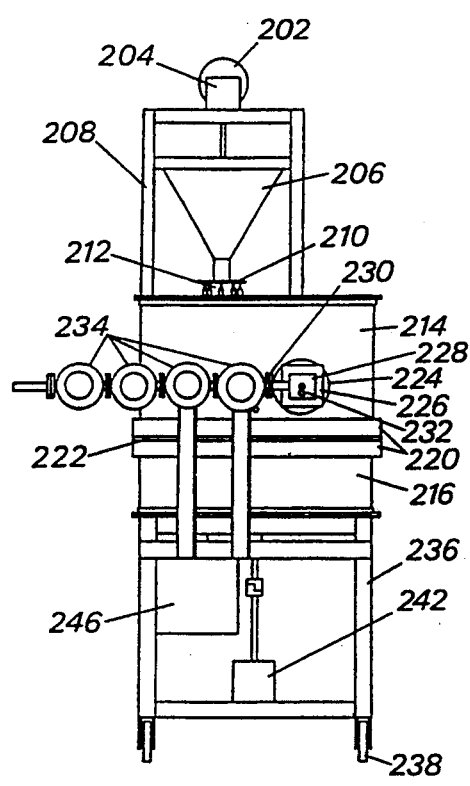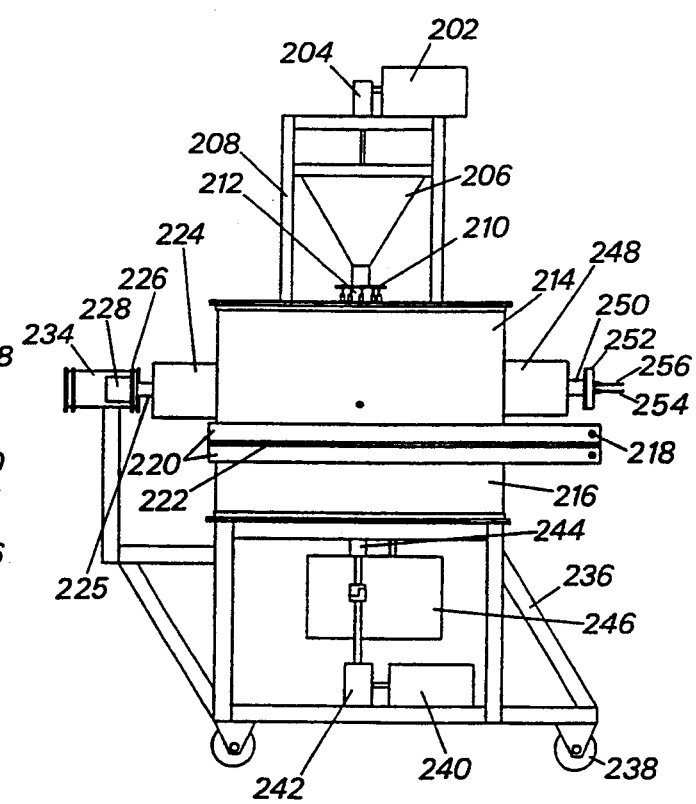
Figure 3
Figure 4

SMOKE GENERATOR FOR FOOD SMOKING KILNS

BACKGROUND OF THE INVENTION

1. Field of the Invention

This invention relates to a machine to generate smoke from wood or similar organic matter. The smoke produced is intended for supply to food smoking kilns. The smoke generator could also be used to generate smoke from a variety of combustible materials for other conceivable practical purposes or for research purposes.

This invention provides the capacity to produce smoke with control over the major parameters of smoke generation. The smoke would be produced from organic matter such as wood particles, and would be used for supply to food smoking kilns or for other purposes, either practical or scientific. With this machine, the effects that the parameters of smoke generation have on the properties of the smoke with respect to its use for food smoking could be studied in a scientific manner. Smoke generation parameters could be selected and controlled so that the smoke generator would supply smoke that has been produced under conditions optimizing the desirable components and qualities and minimizing the undesirable constituents in the smoke for food curing. The smoke generation parameters and smoke qualities could be held consistent for any desired period of operation. The smoke generator also has the capacity to selectively vary the different generation parameters independently.

Smoke can be generated in a concentrated form with little or no dilution by air or other added gases with this design of smoke generator, while in typical smoke generation practice, the combustion reactions that begin during smoke formation must be quenched by cooling the smoke gases by dilution with ambient air or some other cool gas, resulting in the production of diluted smoke.

The generator has the capacity to rapidly vary the rate of smoke production. Since the smoke generation parameters can be automatically monitored and controlled by computer, the generator could quickly control the smoke supply in response to the requirements of the downstream food smoking process. With this smoke generator, both the rate of smoke generation and the parameters of smoke generation can be monitored and controlled by a process controller and computer.

This smoke generator design has research as well as commercial applications.

2. Description of the Prior Art

Traditionally and still in common practice, smoke for food curing has been generated from smouldering sawdust fires. Other techniques for smoke generation have been devised and employed either for research or commercial applications. A description of the smouldering process will be given here followed by a discussion of some of the previous alternate techniques devised for smoke generation. To date, it appears that none of these previous methods for smoke production can provide the level of control over smoke generation parameters such as can be achieved by the smoke generator design described herein.

Combustion of a fuel source refers to the process of oxidation with the evolution of heat and light, while smouldering refers to incomplete combustion that produces smoke but no visible flame. Typically, the combustion of wood takes place in two stages. Initially heat input to the wood is required to thermally degrade the wood components. This releases gaseous hydrocarbons that combust exothermally at some distance from the wood surface producing a visible flame. As the solid wood is pyrolysed, char remains. The char may support a "glowing combustion" within the solid wood. Too little or too much air may limit these combustion processes. Excess air supply to the zone where combustion of the gases occurs may dissipate so much heat that the initial endothermic pyrolytic reactions are inhibited.

Smoke is produced in large quantities under conditions of inefficient combustion that exist during smouldering. The initial stage of smoke formation begins with the thermal breakdown of the chemical bonds in the macromolecules and polymers of wood. The gases released by these pyrolytic reactions in the wood are exposed to atmospheric oxygen in an oxidative zone surrounding the wood surfaces. The pyrolytic reactions that release gaseous hydrocarbons from wood are mainly endothermic and do not provide sufficient heat energy to maintain the pyrolysis. In the absence of an external thermal energy source, the heat from exothermic oxidation reactions is required to maintain the thermal degradation and volatilization of the wood. The oxidation of the "char" residues of smouldering solids also contributes to the energy input required to drive the endothermic pyrolytic reactions. Smouldering usually occurs in fuels with large surface to volume ratios that promote oxidation reactions at the solid surfaces and favour quenching of the gas-phase oxidative reactions by heat dissipation and gas diffusion. Sawdust is an example of a fuel with a large surface to volume ratio that favours the smouldering process.

Temperatures of 860° C. to 940° C. were typical in the glowing zone of smouldering sawdust burning with a natural air draft. Other researchers believed there was evidence to support the concept that during the initial pyrolytic stage of wood degradation all the known compounds found in wood smoke are formed, and the oxidative reactions probably produced only a quantitative change in the relative amounts of the various airborne smoke chemicals. From a review of wood smoke generation technology, these researchers concluded that, ". . . we are not entitled to say that this wild process, which the self-propagatory combustion of wood indeed is, has been tamed".

Many smoke generators simply employ sawdust beds arranged to sustain a smouldering process by natural air draft. A further common development upon this natural process has been to employ a heat source such as an electric resistance heat element to provide additional heat energy to sustain pyrolytic reactions required for the thermal degradation of wood to form gaseous hydrocarbons.

U.S. Pat. No. 4,270,464 (Kerres, 1981), describes a smoke generator that controls the flow rate of sawdust into a smoke generating chamber that provides a heating element to ignite the sawdust. Excess oxygen is supplied to the smoke generating chamber by a mechanical fan to support smouldering combustion; smoke is produced from glowing sawdust maintained at a temperature just below the flame point in the presence of excess oxygen.

In the Kerres invention, smoke is generated in a single location within the smoke generating chamber. The processes of pyrolysis of wood particles and partial combustion of pyrolytic products occur together at the same location in more or less the same fashion as occurs with a natural smouldering sawdust fire.

Kerres' invention does not physically separate the processes of pyrolysis and combustion reactions required to provide precise operator or computer control over the pyrolysis temperatures in the pyrolysis stage and the levels and temperatures of air supply to the partial combustion stage. Kerres' invention provides an apparatus for sustained consistent production of smoke from a typical smouldering sawdust fire.

Reviews by other researchers cited various other techniques developed for smoke generation that included: (1) friction smoke generation; (2) steam smoke generation; (3) fluidized-bed; (4) two stage generation; (5) isothermal; and (6) carbonization smoke generation.

The friction smoke technique for smoke generation is accomplished by pressing a stick of wood against a rapidly rotating steel wheel or cylinder. The friction between the wheel and the wood generates the heat for pyrolysis. Oxygen for secondary reactions can be supplied through holes in the surface of the metal friction wheel. Pyrolysis temperatures are in the range of 450° C. to 560° C. (lower than most natural smouldering temperatures) and rapid cooling of the smoke limits the secondary oxidative reactions. Meat products treated with friction smoke were found to have different sensory properties from meats smoked by a smouldering source.

Smoke generation was also developed with a system in which pyrolysis was induced by delivering superheated steam at 300° C. to 400° C. containing a small amount of oxygen through a bed of wood chips. Oxygen was required to induce the secondary reactions in smoke chemicals, but the level of oxygen had to be limited since the pyrolysis temperatures increased above the superheated steam temperatures when the oxidative reactions increased.

One researcher has devised a fluidized-bed technique for smoke generation. Air heated between 300° C. to 400° C. was used to suspend a bed of wood particles. The temperature of pyrolysis was difficult to control but high efficiency of wood conversion to smoke components was achieved.

Other researchers described a two stage smoke generator that was further refined by another researcher. In the first stage, pyrolysis of wood was induced by a stream of hot inert gas. The second stage involved pyrolysis at a controlled rate and temperature by addition of a regulated stream of heated air. This system was used to examine the effects of pyrolysis and oxidation temperatures on the quality of smoke used for food curing. It involved the incorporation of large volumes of inert gases and air into the final smoke.

Another researcher developed an isothermal smoke generator that fed sawdust by an auger through a pipe heated by electric elements. Oxygen was limited but not accurately controlled. In order to control the temperature, the pyrolysis zone had to be kept below 500° C. to prevent run-away heating due to exothermal reactions at higher temperatures.

The carbonization process for smoke generation involved compressing sawdust in a tubular casing with a tapered screw. Most of the air in the sawdust is eliminated and a variable temperature heating element at the end of the screw casing causes the production of smoke during carbonization.

A German patent application described a process for generating food curing smoke by direct microwave pyrolysis. It was claimed that the pyrolysis temperature was always maintained below 400° C. without thermostatic control and the resulting smoke had low concentrations of undesirable components.

All of these different types of smoke generators produced smoke with variations in moisture content, oxygen content and ratios of chemical components. However, researchers noted that in all cases, researchers compared their results to foods cured with smoke produced by the traditional smouldering process.

Various researchers have reported that changing the parameters of smoke generation (such things as the pyrolysis temperature, the level of partial combustion, the initial moisture level of the wood, and the wood species) changed the relative balance of chemicals in the smoke. Some work has been done to identify smoke generation parameters that would optimize the levels of desirable components in wood smoke and minimize the less desirable chemicals. A review of these attempts indicates there has been to date a lack of defined control over the relevant parameters for smoke generation. This has prevented accurate specification of optimal smoke generation parameters. This innovative smoke generator design will enable research to define optimal smoke generation parameters for food curing purposes. Subsequently, these generation parameters will be readily reproduced in commercial food smoking processes by the application of this smoke generator design.

SUMMARY OF THE INVENTION

It is an object of the invention to provide an improved smoke generator.

The smoke generator of the present invention produces smoke from combustible matter (such as particulated wood, and hereinafter referred to as such for convenience) under a controlled set of generation parameters that can be varied over a selectable, continuous range of operating set-points. The pyrolysis and partial combustion phases of smoke production have been physically separated and independently controlled. As well, this smoke generator incorporates an apparatus to cool the evolved smoke gases to near ambient conditions by heat exchange rather than by dilution with cool gases (i.e. ambient air) as is the typical method of smoke cooling in other smoke generators. The ability of this design to control the parameters of smoke generation for food curing is not disclosed in the prior art referred to above.

The smoke generation parameters that can be controlled and varied include:

a. the feed rate of combustible matter, e.g. particulated wood, to the smoke generator b. the pyrolysis temperature for the thermal degradation of wood particles c. the hold-up time during which the wood particles are subjected to pyrolysis d. the rate of air supply to the partial combustion stage of smoke generation (i.e. the air:fuel ratio)

e. the temperature of the partial combustion air supply upon delivery to the partial combustion zone f. the pyrolysis and partial combustion stages of smoke generation are separated and independently controlled g. the concentrated, high temperature smoke gases are cooled by heat exchange rather than by dilution with air or other cool diluting gases.

The smoke generator incorporates a physical separation between the initial pyrolysis of the wood and the partial combustion of the gaseous hydrocarbons formed by wood pyrolysis. Pyrolysis of wood causes thermal degradation of wood components releasing a gaseous phase of hydrocarbons at elevated temperature. The elevated temperature of the pyrolysed hydrocarbons is conserved until delivery to the separated partial combustion zone where the supply of partial combustion air also at a predetermined elevated temperature is mixed with pyrolysis gases so that incomplete or partial combustion of the pyrolytic gases will occur. The supply of partial combustion air can be varied from no air to a supply rate in excess of that required for complete combustion. In other words, smoke could be generated over the full range from complete pyrolysis to almost complete stoichiometric combustion. At the same time, the pyrolysis temperature and the temperature of the partial combustion air can be varied over a wide range of setpoint.

This smoke generator is also equipped with an apparatus to cool the smoke gases by mechanical heat exchange rather than by dilution with ambient air as is more usually the case. The smoke cooling apparatus is specially designed to minimize losses of condensed aerosol phase of smoke by thermophoresis at the cool metal heat exchange surfaces. This is most important for initial research studies into the influence that smoke generation parameters have upon the resulting size distributions of the smoke aerosols produced. Cooling the hot smoke gases by heat exchange facilitates generation of a very concentrated smoke. Cooling the smoke is necessary to quenches combustion reactions. If desired, the concentrated smoke may then be diluted with ambient air to create a more diluted smoke source.

The novel features of this smoke generator design facilitate the generation of smoke under well defined conditions that can be easily reproduced. The wood pyrolysis temperature, pyrolysis time, subsequent partial combustion of the pyrolysis gases, temperature and rate of partial combustion air supply, and rapid cooling of the final smoke gases in a concentrated form can be achieved.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which:

FIG. 3 is a front view of the smoke generator on a portable stand with the sawdust feeder and smoke cooling apparatus attached.

FIG. 4 is a side view of the smoke generator on a portable stand with the sawdust feeder and smoke cooling apparatus attached.

Further features of the invention will be described or will become apparent in the course of the following detailed description.

DESCRIPTION OF THE PREFERRED EMBODIMENT(S)

Figure 1:
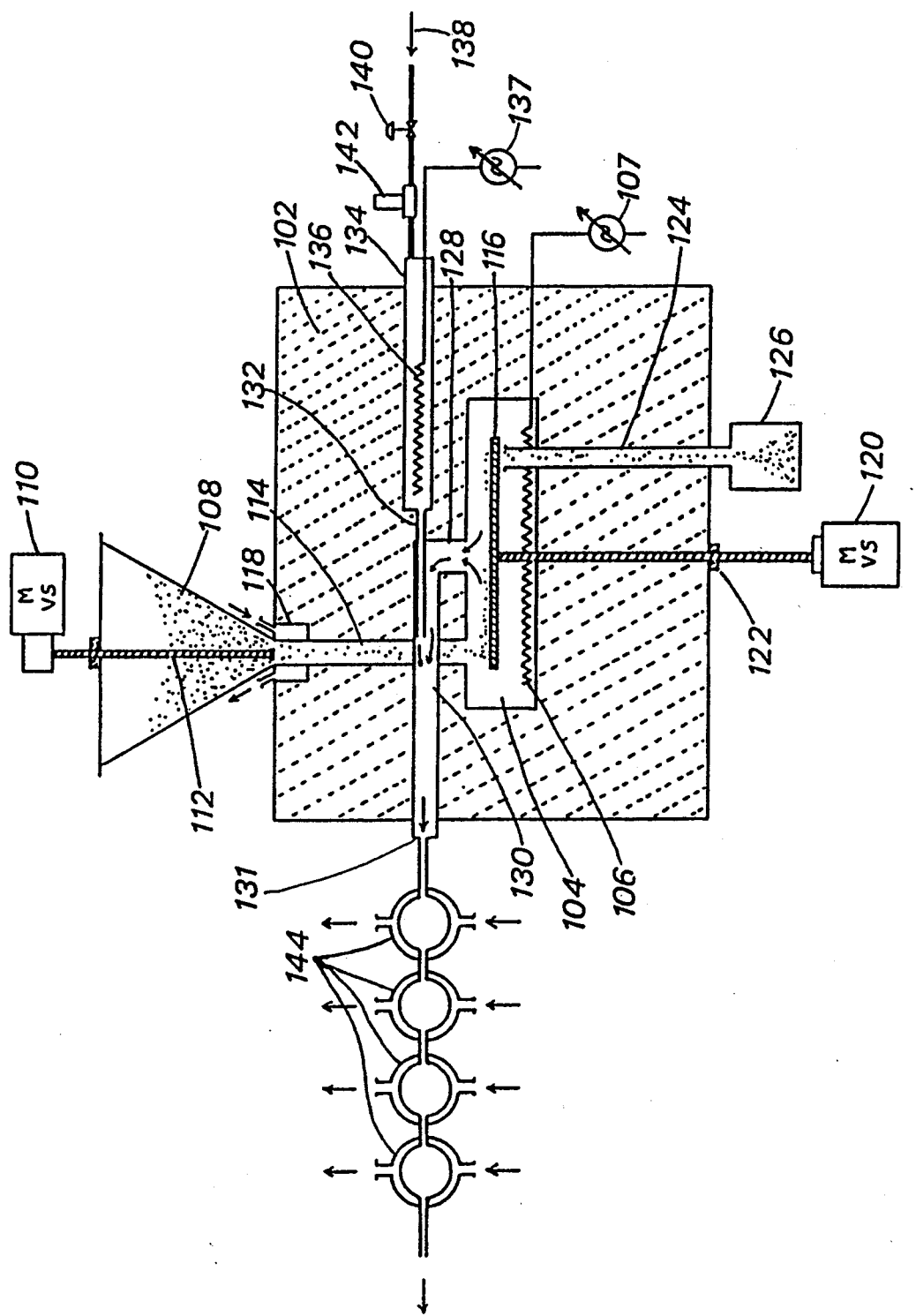
FIG. 1 is a schematic diagram of the smoke generation process achieved by the innovative smoke generator described in this patent application.

FIG. 1 is a schematic diagram of the smoke generation process. The smoke generator consists of an air tight shell lined with refractory insulation 102 that serves to maintain the elevated temperature created in the pyrolysis chamber 104 by an electric resistance heater element 106. An adjustable power supply 107 provides power to the electric resistance heater element 106. Sawdust is fed into the pyrolysis chamber from an air tight hopper 108 mounted on the top of the smoke generator. A variable speed motor 110 operates a shaft with a feeder mechanism 112 to feed a measured rate of sawdust into a channel 114 where the sawdust drops by gravity onto the outer edge of a flat round metal plate 116 in the pyrolysis chamber. The upper end of the sawdust feeder channel has a water cooled jacket 118 that prevents heating of the sawdust prior to its delivery to the pyrolysis plate. The pyrolysis plate is rotated by a variable speed motor 120 beneath the smoke generator body and the shaft from the variable speed motor to the pyrolysis plate has a gas tight seal 122 around it at the point where it passes through the bottom of the smoke generator.

Sawdust resides on the pyrolysis plate for most of one complete revolution after which a set of fixed scraper blades (not depicted in FIG. 1) remove the ash remains of the sawdust which drops off the edge of the pyrolysis plate 116 and fall into a vertical channel 124 for ash removal. The ash drops down this channel through the bottom of the furnace into an air tight ash collector box 126. As the sawdust resides on the plate, it is exposed to the elevated temperatures of the metal plate and the pyrolysis chamber. The temperature of the chamber and pyrolysis plate is controlled by the use of an adjustable power supply 107 to the electric heater element 106 and the temperature is monitored by thermocouples placed at strategic locations in the pyrolysis chamber. The temperature monitored at the surface of the pyrolysis plate will be referred to as the "pyrolysis temperature" at which thermal decomposition and gasification of the sawdust is achieved. The pyrolysis temperature may be automatically monitored and controlled by use of suitable controllers and transducers coupled to a computerized process controller.

The production of pyrolysis gases in the pyrolysis chamber 104 creates a positive pressure that results in the pyrolytic gases exiting into the partial combustion chamber 130 where a measured supply of preheated air is mixed with the pyrolytic gases to cause partial combustion. This system separates the pyrolytic and partial combustion stages of smoke formation which normally both take place at the location where sawdust is smoldering. Following partial combustion in the partial combustion chamber 130, the smoke exits the furnace at smoke outlet 131.

As the sawdust is pyrolysed, the gaseous volatile destruction products (VDP) are removed from the pyrolysis chamber into a channel 128 at the top of the pyrolysis chamber. These gaseous hydrocarbons flow into a partial combustion chamber 130 above the pyrolysis chamber at an elevated temperature. There is a smaller pipe 132 that delivers a supply of preheated air to be mixed with the VDP from the pyrolysis chamber so that a level of partial combustion may be achieved. The temperature and flow rate of this air supply can be controlled so that a selectable specified level of partial combustion of the pyrolytic gases from the sawdust occurs. The partial combustion air supply is delivered through a pipe 134 inside the smoke generator. This pipe houses an electric resistance heater element 136 whose temperature can be controlled by a second adjustable power supply 137. The partial combustion air 138 is delivered from a compressed air source and passes through a metering valve 140 and a flow meter 142. After the VDP and the preheated air supply are mixed at elevated temperature in the partial combustion chamber 130 to achieve partial combustion, the concentrated hot smoke gases are passed through a series of water jacketed cylindrical heat exchanger chambers 144 so that the smoke will be cooled to near ambient temperatures and the combustion reactions quenched without dilution of the smoke by cooling air.

By this process a controlled rate of sawdust is pyrolysed at a selected temperature for a selected time interval. The VDP gases are removed to a secondary chamber at elevated temperatures where a controlled rate of preheated combustion air is mixed with them to achieve a predetermined level of partial combustion. These hot combustion products are cooled by mechanical heat exchanger rather than by dilution with ambient temperature air as is the usual case so that the combustion reactions are quenched and the smoke is maintained in a concentrated state.

Figure 2:
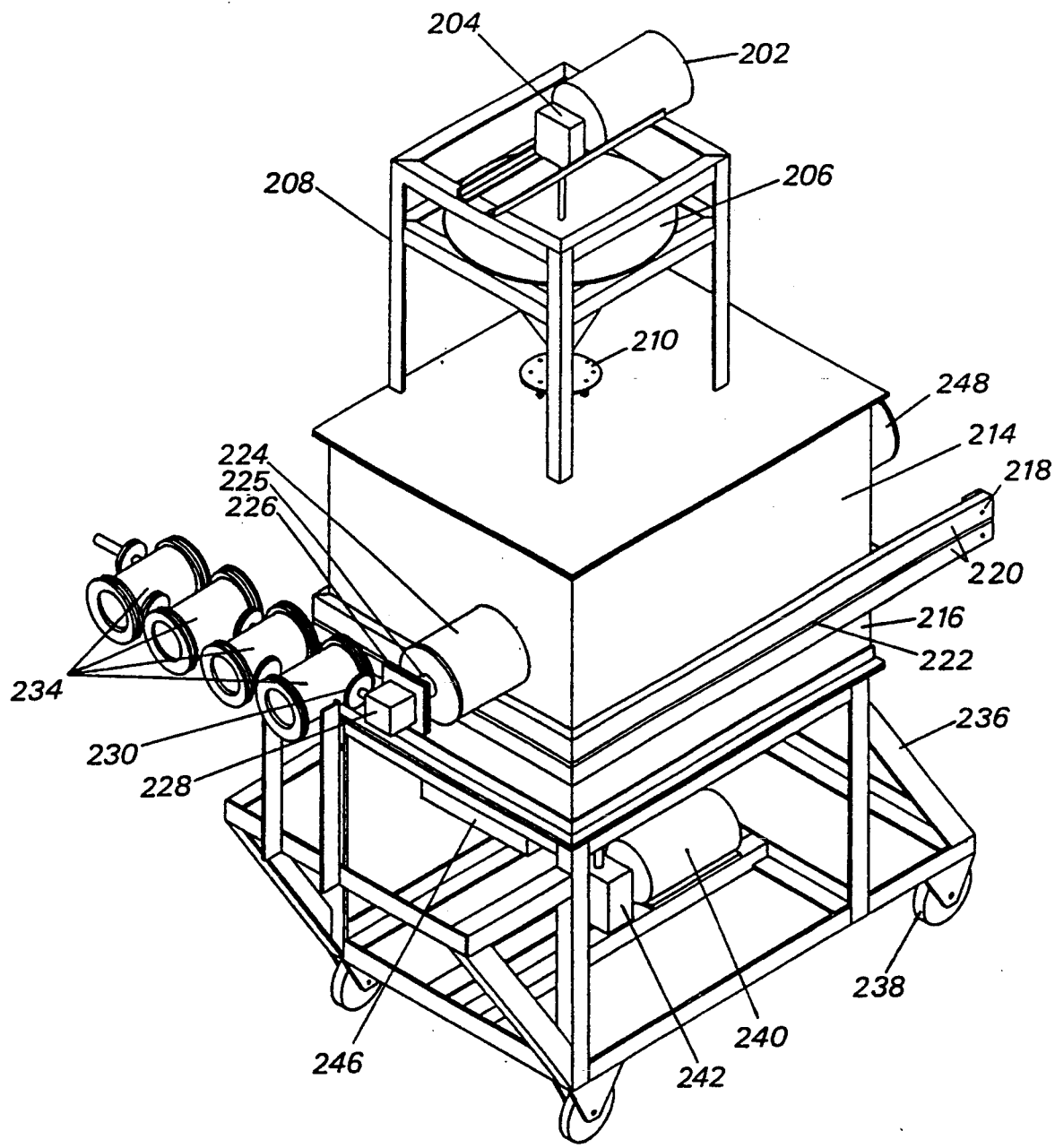
FIG. 2 is an isometric sketch of the smoke generator on a portable stand with the sawdust feeder and smoke cooling apparatus attached.

This following section of description mainly refers to the sketches shown in FIGS. 2, 3 and 4.

FIGS. 2, 3 and 4 show sketches of one particular embodiment or configuration for the smoke generation process described previously and depicted in FIG. 1. FIG. 2 is an isometric sketch of the smoke generator on a portable stand with the sawdust feeder and smoke cooling apparatus attached. The sawdust feeder mechanism consists of a variable speed motor 202 and a gear head reducer 204. The motor drives a shaft that operates a sawdust metering and feeding mechanism at the bottom of a conical hopper 206. The sawdust feeder including the bearing where the feeder shaft passes through the lid of the sawdust hopper are sealed gas tight to maintain the pyrolytic conditions inside the smoke generator. The sawdust hopper and feeder motor are mounted on an angle iron frame 208. The sawdust hopper and feeder mechanism are attached by a gasketed flange 210 that is fitted to the top of the water jacketed sawdust feeder channel 212 that extends through the top steel shell of the smoke generator.

The body of the smoke generator consists of an upper 214 and a lower 216 steel box. The two boxes are hinged 218 at the extension of two square flanges 220 that have an air tight gasket 222 between them to keep the pyrolysis chamber in the generator air tight. The two square tube flanges may have bolts or some form of clamping mechanism between them to exert pressure to seal the gasket between the flanges.

A cylindrical steel shell 224 that is lined with refractory insulation houses an extension of the pipe in which partial combustion of the pyrolysis products has occurred. The hot smoke gases exit the body of the furnace at the smoke outlet 225 following partial combustion. There is a square flange 226 at the end of the partial combustion pipe that extends beyond the cylindrical insulated housing. A square steel box 228 with a matching square flange is fitted to the smoke outlet 225 at the flange on the end of the partial combustion pipe. There is a pipe with a flange 230 exiting the square box providing the conduit for the hot smoke from the partial combustion pipe to enter the smoke cooling cylinders. All the flanges at the joins are air tight. The front face of this square box has provision for the air tight insertion of two sheathed thermocouples 232 that extend into the partial combustion pipe. Four cylindrical chambers 234 that have water cooled outer jackets are connected at the outlet from the smoke generator to cool the hot smoke gases that issue from the partial combustion pipe. These cylinders cool the smoke in a concentrated form by mechanical heat exchange rather than by dilution with ambient air.

The smoke generator is supported on an angle iron stand 236 which rests on four heavy duty caster wheels 238 so that the smoke generator is portable. A variable speed motor 240 used to rotate the pyrolysis plate is mounted on the frame beneath the smoke generator. The motor is coupled to a gear head reducer 242 which is coupled to the drive shaft of the pyrolysis plate. The drive shaft for the pyrolysis plate passes through the bottom of the smoke generator via a water-cooled gas tight bearing 244. A gas tight ash collector box 246 is attached to the ash removal channel at the point where it passes through the bottom of the smoke generator.

At the back of the upper half of the smoke generator, there is a cylindrical extension 248 that is lined with refractory insulation and houses an extension of the air supply pipe 250 that delivers partial combustion air to the partial combustion zone. The partial combustion air supply pipe is capped with a flange plate 252. The flange plate has o gas tight seals for insertion of an electric resistance heater element 254 and a partial combustion air supply tube 256.

Figure 5:
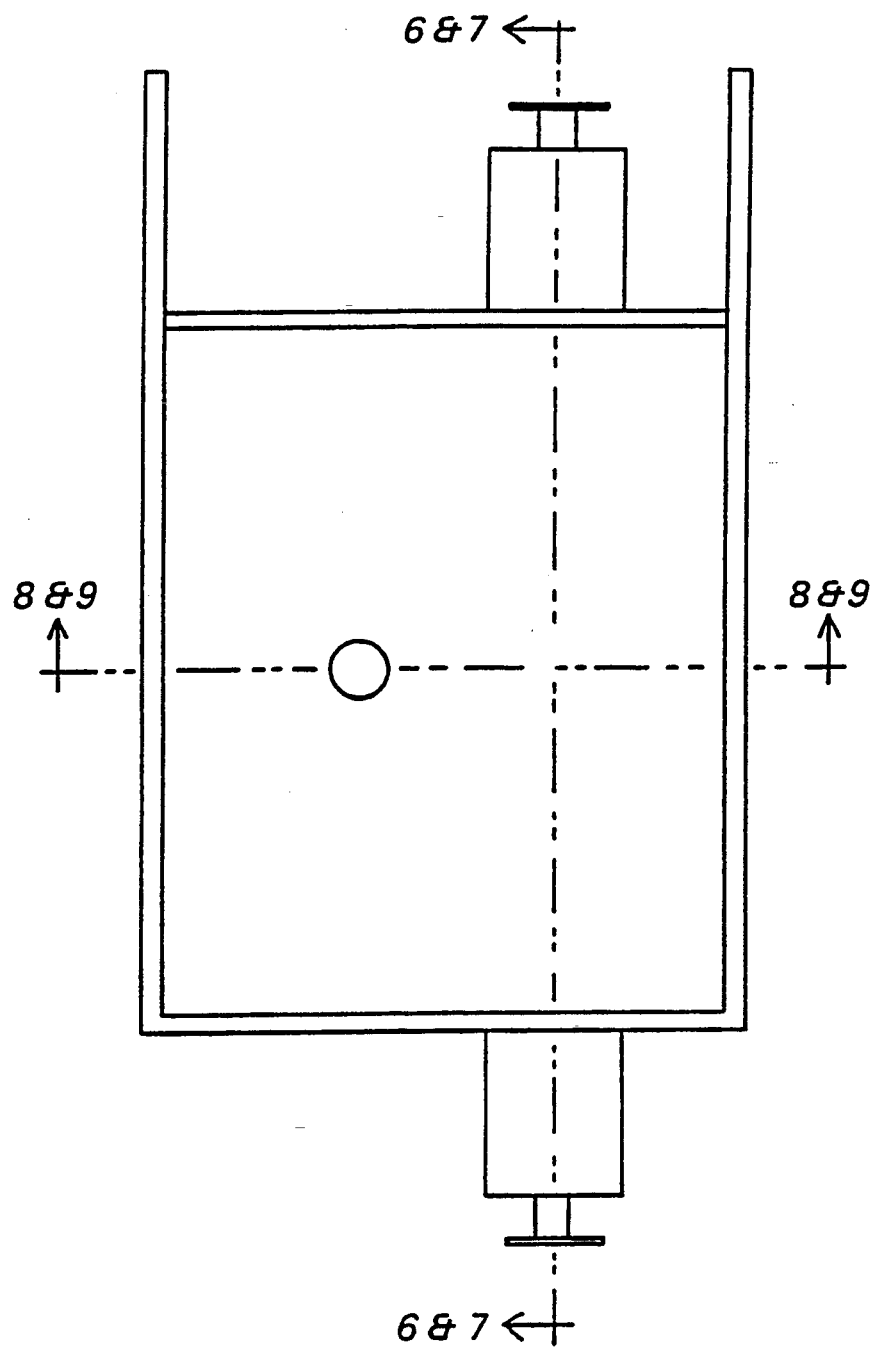
FIG. 5 is a top view of the smoke generator body showing section lines to locate the sectional views in FIGS. 6 and 7 and FIGS. 8 and 9.
Figure 6:
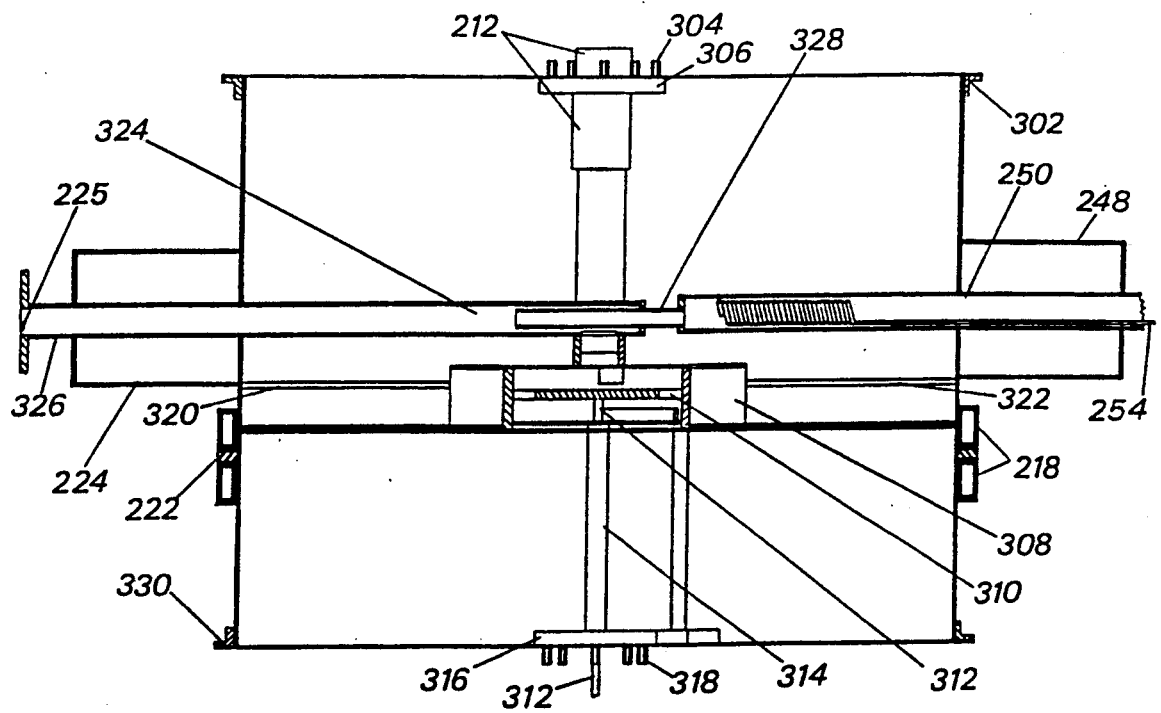
FIG. 6 is a cross section through the smoke generator showing a section of the air supply pipes and the combustion pipe without refractory insulation installed.
Figure 7:
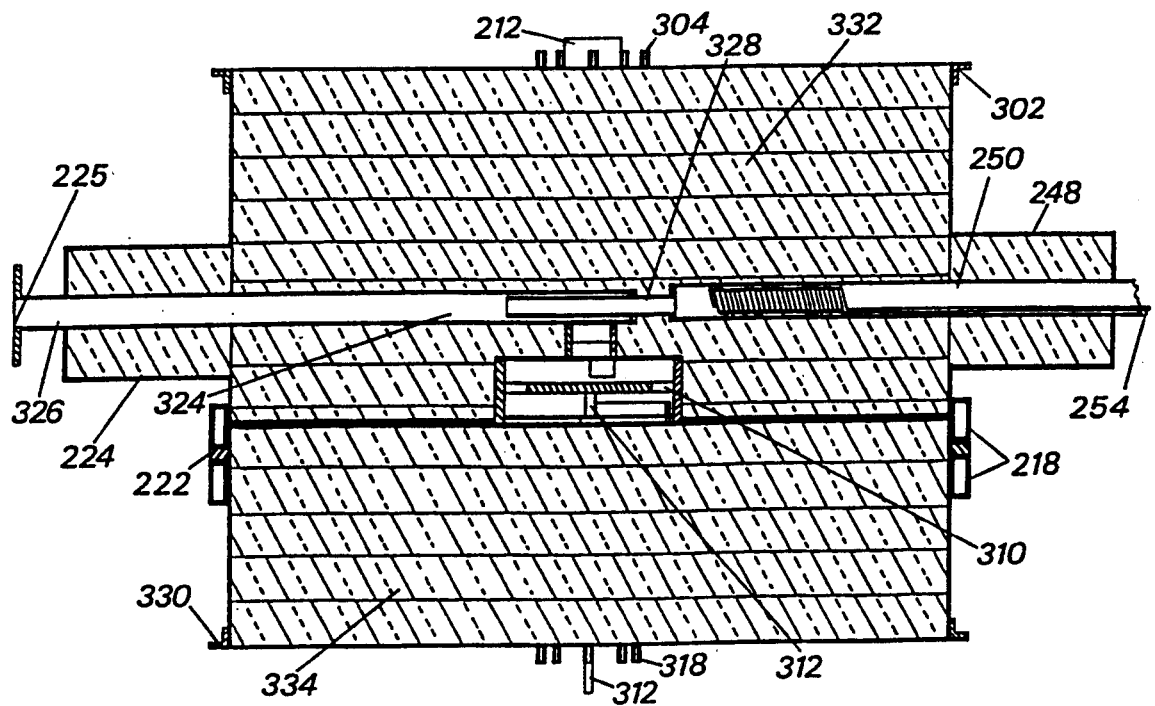
FIG. 7 is a cross section through the smoke generator showing a section of the air supply pipes and the combustion pipe with refractory insulation installed.
Figure 8:
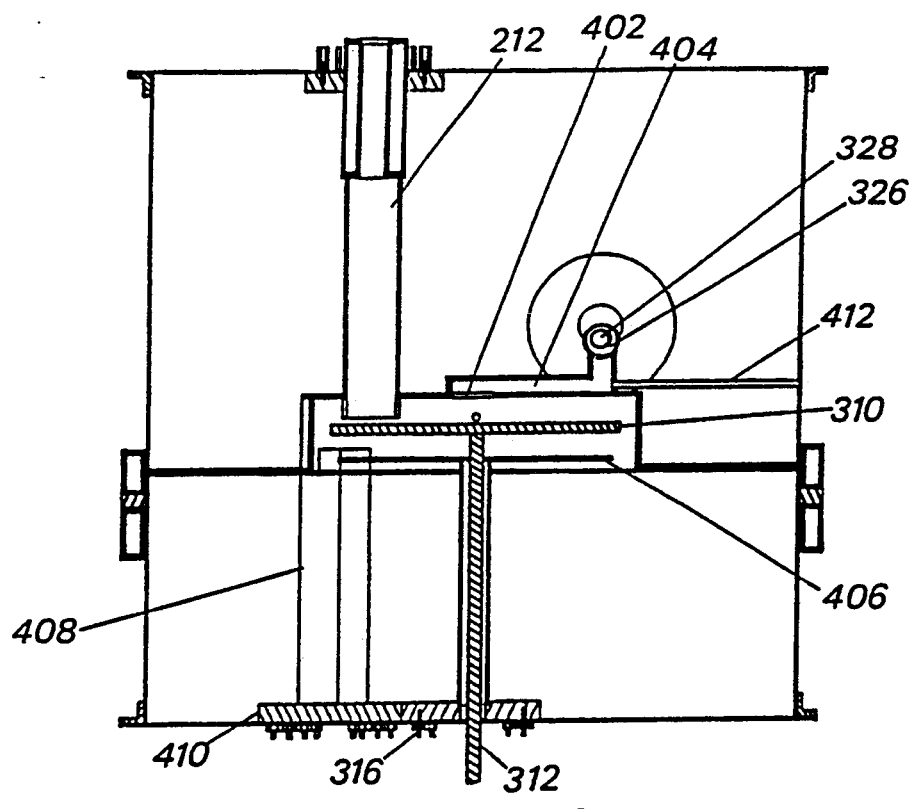
FIG. 8 is a cross section through the smoke generator showing a section through the sawdust feeder channel and pyrolysis chamber without refractory insulation installed.
Figure 9:
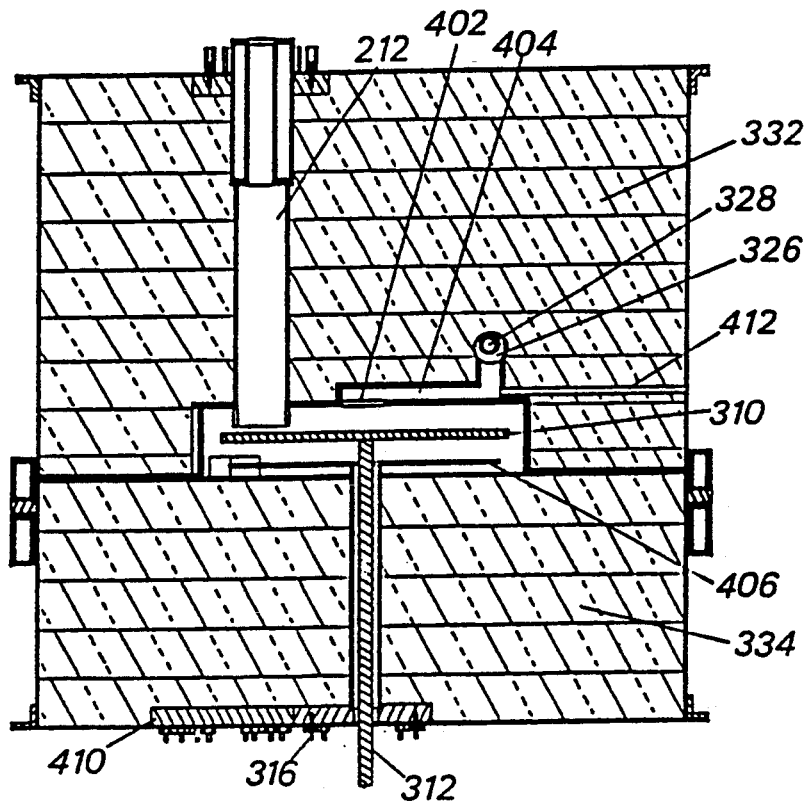
FIG. 9 is a cross section through the smoke generator showing a section through the sawdust feeder channel and pyrolysis chamber with refractory insulation installed.

FIG. 5 depicts the top view of the smoke generator body and it shows section lines to locate the sectional views in FIGS. 6 and 7 and in FIGS. 8 and 9.

This following section of description mainly refers to the sketches shown in FIGS. 6 and 7.

FIGS. 6 and 7 are side views of the upper and lower halves of the smoke generator shown with a side sectional view through the centre line of the partial combustion air supply pipe and the partial combustion pipe. FIG. 6 depicts this sectional view without the refractory insulation that lines the smoke generator while FIG. 7 depicts the same view with the refractory insulation in place.

An angle iron flange 302 is welded around the top edge of the upper smoke generator box. This flange is used to bolt the top lid of the box in place with an air tight gasket.

Eight coupling nuts 304 are used to seal the gasketed flange 306 of the sawdust feeder channel 212. The sawdust feeder channel is attached to an entrance port on the top of the pyrolysis chamber 308 located so that the sawdust from the sawdust feeder falls onto a specified location on the circular flat metal pyrolysis plate 310. The pyrolysis plate is supported and rotated on a metal shaft 312. The pyrolysis plate shaft 312 passes through the bottom smoke generator box inside a pipe section 314 that is sealed at the top of the box by weld and at the bottom of the box by a gasketed flange 316. This sealed enclosure for the pyrolysis plate shaft is provided to ensure that dust or particles of the refractory insulation have no point of entry inside the pyrolysis chamber so that the smoke will not become contaminated. Eight bolts 318 are employed to seal the gasketed flange around the pyrolysis plate shaft pipe to the bottom shell of the smoke generator box.

Two thin walled metal pipes or tubes 320 and 322 are inserted between the front and back walls of the upper smoke generator box and the cylindrical metal wall of the pyrolysis chamber 308. These metal tubes are welded at each end to seal the pyrolysis chamber from exposure to refractory insulation particles. These two metal tubes act as sheaths for insertion of thermocouples to monitor the temperature of the upper surface of the pyrolysis plate. The sheathed thermocouples are also sealed air tight at the outer wall of the smoke generator box to maintain the pyrolysis chamber air tight.

Partial combustion air is supplied to the smoke generator's pyrolysis chamber via a partial combustion air supply pipe 250. The partial combustion air is preheated before injection into the partial combustion zone 324 of the partial combustion pipe 326 by an electric resistance heater element 254. A small diameter pipe 328 forms a nozzle for injecting the preheated partial combustion air into the combustion zone 324 to mix with the hot pyrolysis gases coming from the pyrolysis chamber. There is a cylindrical extension 224 from the front of the upper smoke generator box to provide a space for insulation around the partial combustion pipe 326, and a similar cylindrical extension 248 around the partial combustion air supply pipe 250.

A flange 330 is welded around the lower edge of the bottom smoke generator box similar to the flange 302 around the top edge of the upper smoke generator box. These serve to make the top and bottom of the two smoke generator halves removable so that there is access to the internal parts of the smoke generator bodies; and, the refractory insulation lining can be installed and be sealed air tight inside the smoke generator boxes. The cross hatched lines in FIG. 7 indicate the location of refractory insulation lining 332 in the upper smoke generator box and 334 in the lower smoke generator box. Square tubes acting as flanges 218 on the upper and lower smoke generator boxes have a silicon rubber gasket 222 between them to seal the pyrolysis chamber against outside air.

This following section of description mainly refers to the sketches shown in FIGS. 8 and 9.

FIGS. 8 and 9 are front views of the upper and lower body halves of the smoke generator shown with a sectional view through the centre of: the pyrolysis chamber, the channel that carries the pyrolysis gases to the partial combustion pipe, and the channel from the sawdust feeder to the pyrolysis chamber. FIG. 8 depicts this sectional view without the refractory insulation while FIG. 9 depicts the same view with the refractory insulation in place (see also FIG. 5).

The sawdust feed channel 212 is shown in cross section and depicts the water cooled jacket around the upper end. This cooling jacket keeps the sawdust from being preheated before it leaves the sawdust hopper to drop onto the pyrolysis plate. The sawdust feed channel extends through the top of the pyrolysis chamber. After it passes through the pyrolysis chamber, the front half of the pipe is cut away so that the sawdust can move freely along with the pyrolysis plate 310 as it rotates. There is a circular port 402 at the top centre of the pyrolysis chamber. This leads into a channel 404 that conducts the pyrolytic gases into the partial combustion pipe 326 where they are mixed with the preheated partial combustion air issuing from the nozzle pipe 328.

The location of the electric resistance heater element 406 inside the pyrolysis chamber beneath the pyrolysis plate is shown in FIGS. 8 and 9.

The sawdust removal channel 408 is shown in FIG. 8. It extends through the top of the lower smoke generator box to just beneath the lip of the pyrolysis plate at the location where the ash scraper blades (not shown) remove the ash from the plate. A section through one side of the flange 410 on the bottom of the ash removal channel is shown bolted to the bottom plate of the lower smoke generator box. A section through the flange 316 joining the pyrolysis plate shaft casing to the bottom plate of the lower smoke generator box is also shown in FIGS. 8 and 9. Both of these flanges are tapped for bolts. The tapped bolt holes in the ash removal channel flange are used to secure an ash collector box (see 248 in FIGS. 2,3 and 4) with an air tight seal. The tapped bolt holes in the pyrolysis plate shaft casing flange are used to attach a gas tight water-cooled bearing for the pyrolysis plate shaft 312.

A metal sheath 412 runs from the outside steel shell of the upper smoke generator box to the side of the pyrolytic gas removal channel. It is sealed around both ends where it passes through the metal walls and serves as a port to insert a thermocouple into the pyrolytic gas channel.

FIG. 9 depicts with cross hatch lines the location of the refractory insulation 332 in the upper smoke generator box and the refractory insulation 334 in the lower smoke generator box.

Figure 10:
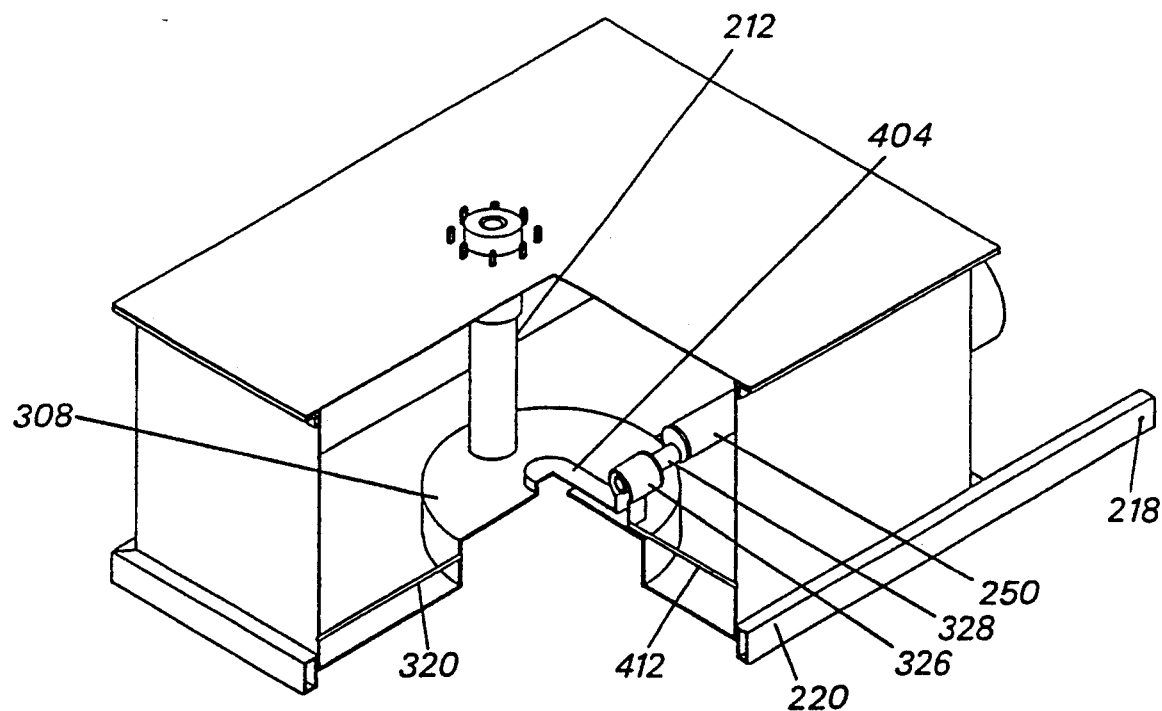
FIG. 10 is an isometric sketch with a half section of the upper half of the smoke generator. It is shown without refractory insulation.
Figure 11:
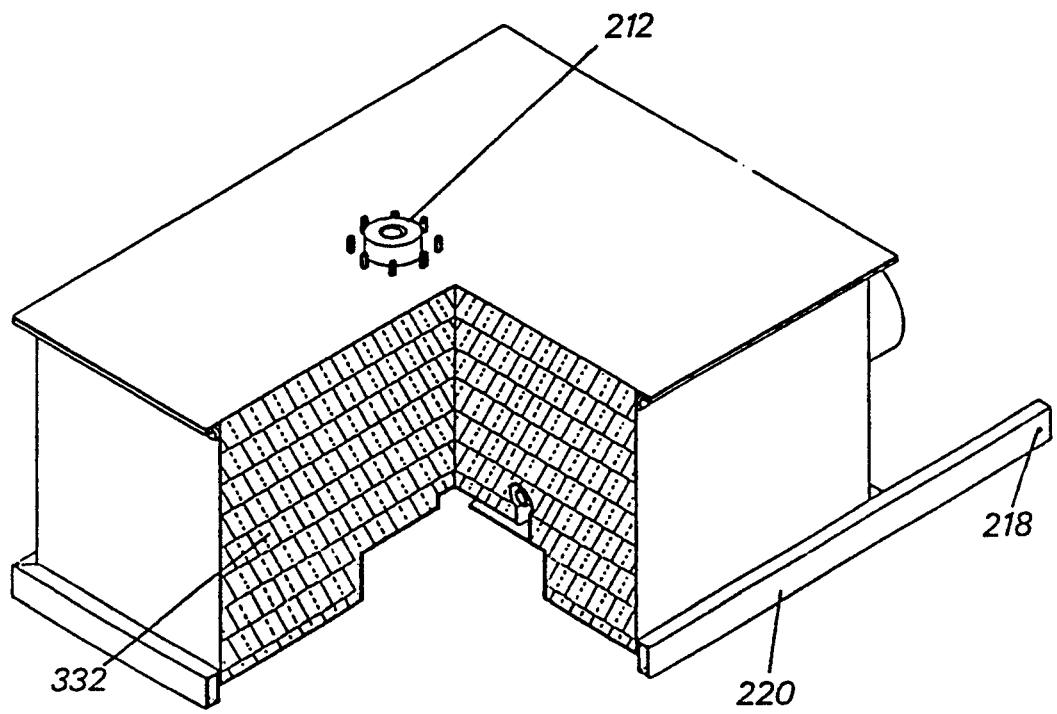
FIG. 11 is an isometric sketch with a half section of the upper half of the smoke generator. It is shown with refractory insulation installed.

This following section of description mainly refers to the sketches shown in FIGS. 10 and 11.

FIG. 10 is an isometric drawing of the upper smoke generator box with a half section to show some of the internal construction without the refractory insulation. FIG. 11 is a similar isometric sketch of the upper smoke generator box with a half section shown with the refractory insulation in place.

The sawdust feed channel 212 is shown extending through the top shell of the smoke generator box in FIG. 11. In FIG. 10, its internal configuration is also shown and the location of its extension through the top of the pyrolysis chamber 308 can also be seen. The configuration of the pyrolytic gas channel 404 is shown in section in FIG. 10. Also the partial combustion air supply pipe 250 is shown in FIG. 10, along with the nozzle pipe 328 and a length of the partial combustion pipe 326. The sheath 320 for insertion of a thermocouple over the pyrolysis plate is shown in section in FIG. 10; and, the sheath 412 for insertion of a thermocouple into the pyrolytic gas channel is also seen in section. FIG. 11 shows the location of the refractory insulation 332 lining the upper smoke generator box. The attachment of a square metal tube 220 around the bottom edge of the upper smoke generator box is shown in FIGS. 10 and 11. The extension of the square tube to provide an offset hinge 218 between the upper and lower smoke generator boxes is also shown.

Figure 12:
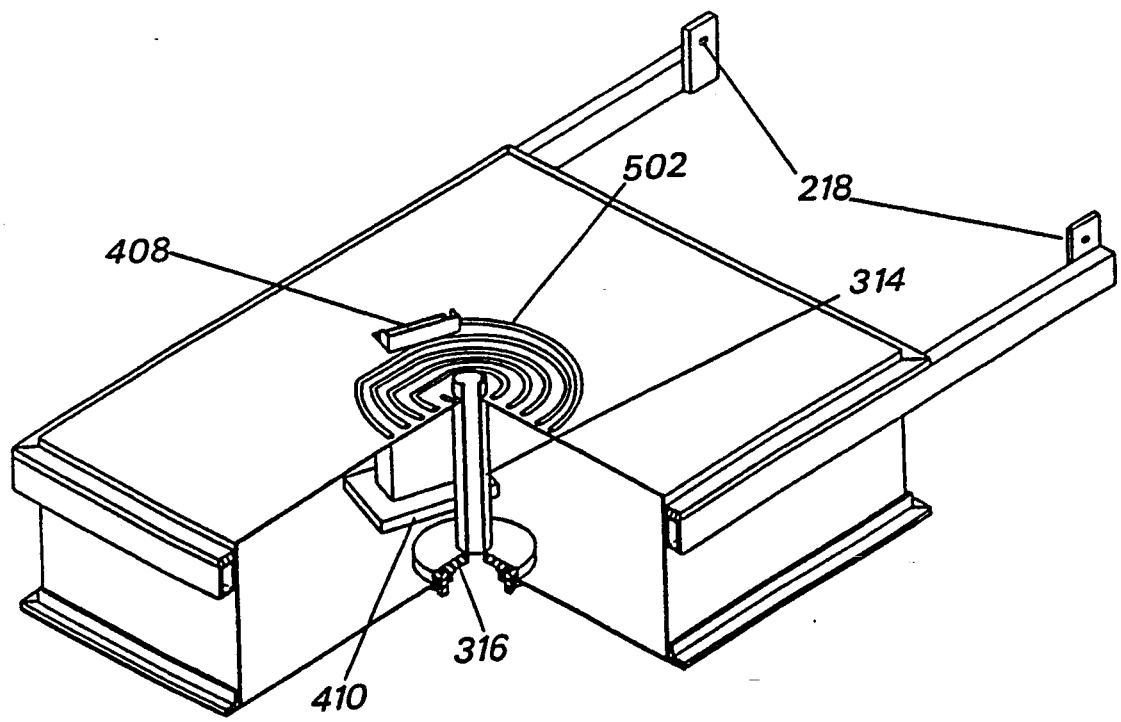
FIG. 12 is an isometric sketch with a half section of the lower half of the smoke generator. It is shown without refractory insulation installed.
Figure 13:
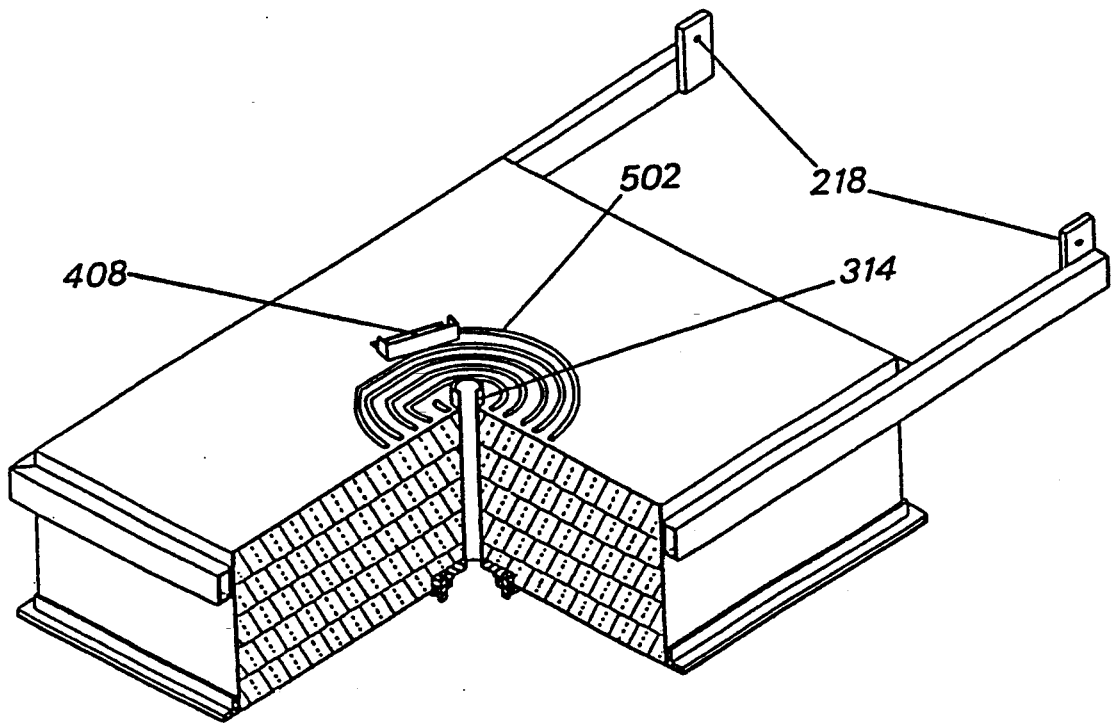
FIG. 13 is an isometric sketch with a half section of the lower half of the smoke generator. It is shown with refractory insulation installed.

This following section of description mainly refers to the sketches shown in FIGS. 12 and 13.

FIG. 12 is an isometric drawing of the lower smoke generator box with a half section to show some of the internal construction without the refractory insulation. FIG. 13 is a similar isometric sketch of the lower smoke generator box with a half section with the refractory insulation in place.

The hinge 218 to join the upper and lower smoke generator boxes is shown on the extension of the square flange that joins the upper and lower smoke generator boxes. The top of the ash removal channel 408 that extends through the top plate of the lower smoke generator box is shown. The flat spirally coiled electric heating element 502 is seen located so that it fits in the bottom of the pyrolysis chamber when the upper smoke generator box is closed in place. The pyrolysis plate shaft casing 314 is depicted with a half section removed. The casing extends through the top of the lower smoke generator box and it is attached to the floor of the box by a bolted flange 316. In FIGS. 12 and 13, the flange is shown bolted to the bottom of the smoke generator box with a ring of bolts around the outer edge. There is another ring of tapped holes inside these bolts that are intended to provide attachment for a gas-tight water-cooled bearing for the pyrolysis plate shaft. The flange 410 on the bottom of the ash removal channel 408 that attaches the ash removal channel to the bottom of the lower smoke generator box is shown in FIG. 12. This flange also has a set of bolts around its outside edge to seal the smoke generator box from outside air, and inside these bolts are another set of tapped bolt holes to attach and seal the ash collector box beneath the smoke generator.

Figures 14, 15:
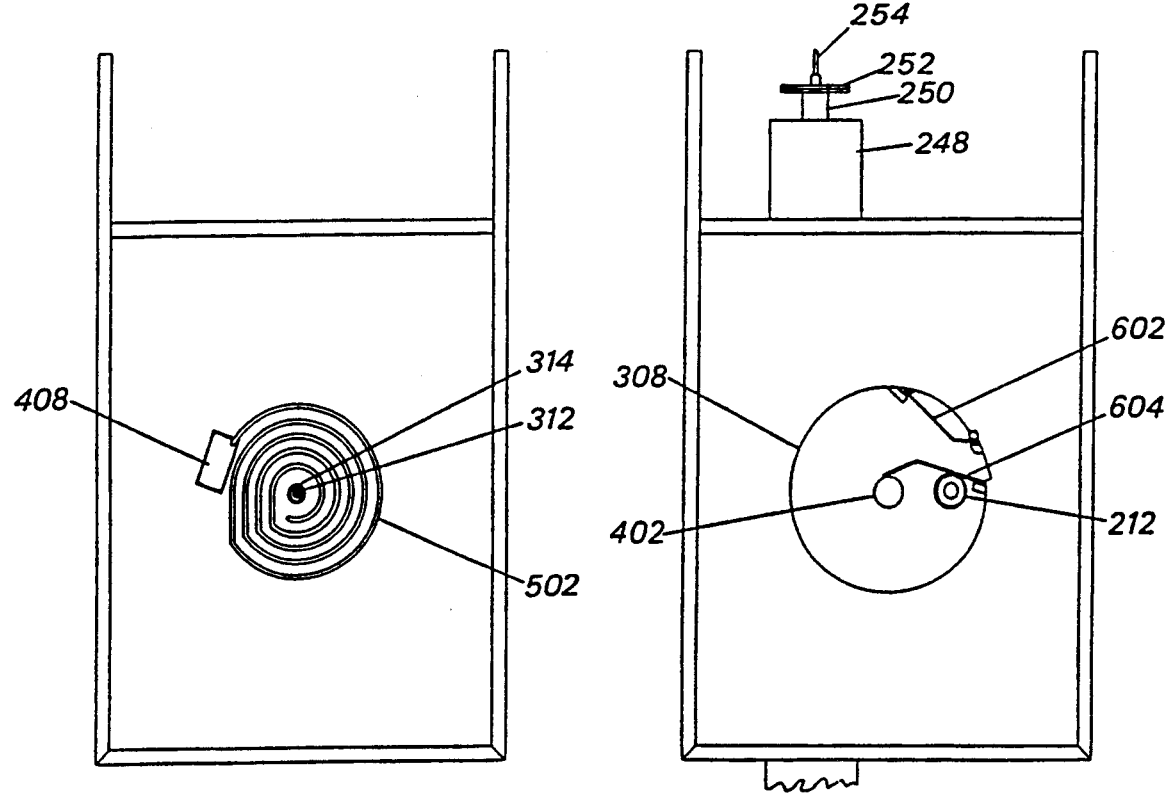
FIG. 14 is a top view of the lower half of the smoke generator depicting the pyrolysis plate shaft in the centre, the spiral electric heating element, and the sawdust removal channel.
FIG. 15 is a bottom view of the upper half of the smoke generator depicting the pyrolysis chamber with the smoke removal outlet at the centre, the sawdust feeder channel, and the two ash removal scraper blades.

This following section of description mainly refers to the sketch shown in FIG. 14.

FIG. 14 depicts a top view of the lower smoke generator box. The top of the ash removal channel 408 is shown. The spiral wound electric resistance heater element 502 is depicted. The inlet end of the heater element passes down the ash removal channel and is brought outside the smoke generator box through a gas-tight seal in the wall of the ash collector box underneath the smoke generator. The top lip of the pyrolysis plate shaft casing 314 is shown and a section of the pyrolysis plate shaft 312 is also depicted.

The following section of description mainly refers to the sketch in FIG. 15.

FIG. 15 shows the bottom view of the upper generator box. The port for removal of pyrolytic gases 402 is depicted in the top centre of the pyrolysis chamber 308. The bottom lip of the sawdust feeder channel 212 is also shown. Two scraper blades 602 and 604 are also shown. The bottom edges of these two scraper blades rest on the top of the pyrolysis plate in a location to scrape the ash from the plate into the ash removal channel after the sawdust has made almost a full revolution on the plate. At the back of the smoke generator, a bottom view of the insulated cylindrical extension 248 around the partial combustion air supply pipe 250 and the flange plate 252 with the electric resistance heater element 254 inserted through the flange plate is also shown.

Figure 16:
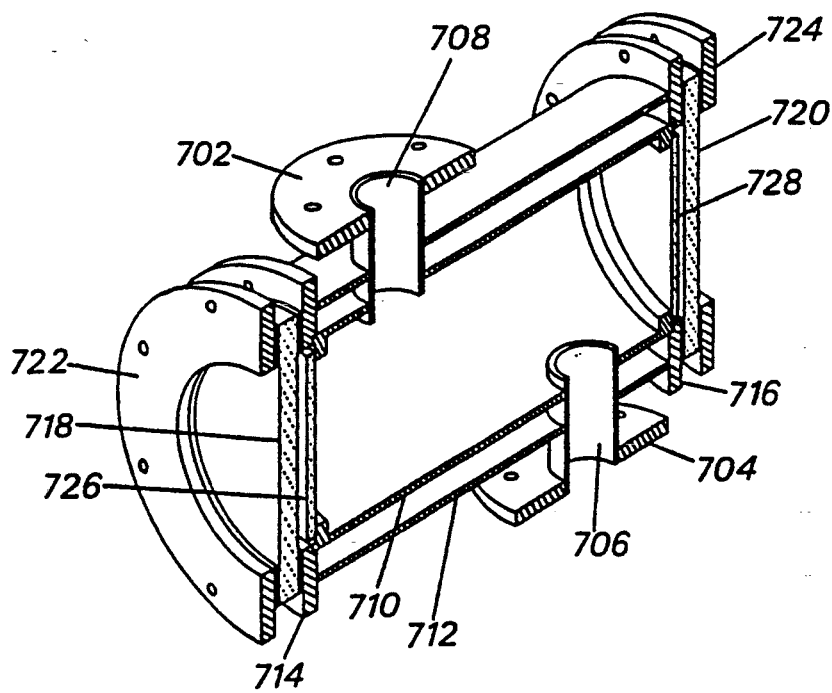
FIG. 16 is an isometric sketch showing a section through a single jacketed smoke cooling cylinder.

The following description makes reference to FIG. 16.

FIG. 16 is an isometric sketch of a single smoke cooling cylinder with a full section to show details of construction. Flange plates 702 and 704 are welded to the outer ends of inlet and outlet pipes 706 and 708 that pass through both cylindrical walls 710 and 712 of the smoke cooling cylinder. The inner 710 and outer 712 walls of the smoke cooling cylinder are welded together and sealed by annular flange plates 714 and 716 at the ends of the cylindrical walls. This forms a sealed jacket through which cool water is circulated. The inlet and outlet nozzles in the outer cylindrical wall for water circulation through the jacket are not shown in this sketch.

Pyrex sight glasses 718 and 720 are placed at either end of the smoke cooling cylinders. These are sealed with annular soft gaskets on both sides of the glasses and held in place by annular flanges 722 and 724 over each end that can be bolted to the top of the flanges sealing the ends of the smoke cooler cylindrical walls. If very high smoke temperatures are anticipated inside the smoke cooling cylinder, two Vycor glass plates 726 and 728 can be mounted underneath the Pyrex sight glasses to act as heat shields for the Pyrex. By this arrangement, hot smoke gases from the smoke generator can be cooled by heat exchange with the inner water cooled wall of the smoke cooling cylinder and therefore the smoke remains in concentrated gas/aerosol phases. The inlet flange 702 of the first smoke cooling cylinder is attached to the flange 230 (see FIGS. 2, 3 and 4) at the outlet from the smoke generator. Additional smoke cooling cylinders can be attached in series with the smoke outlet to inlet flanges.

Figure 17:
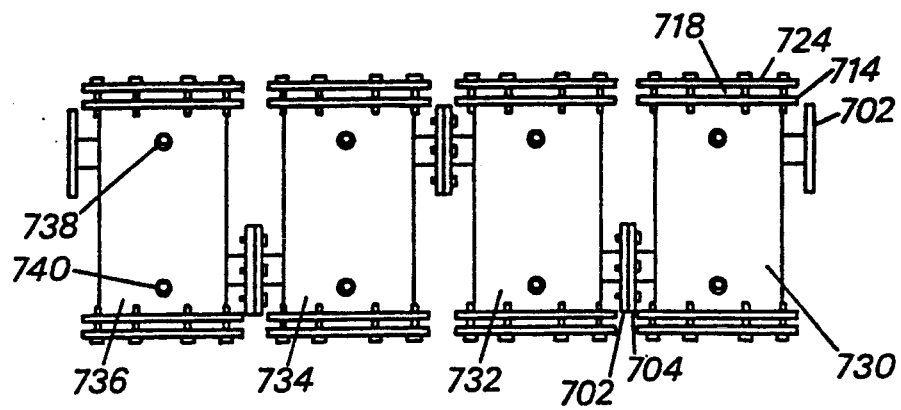
FIG. 17 is a top view of an assembly of four smoke cooling cylinders attached in series by bolted flanges.
Figure 18:
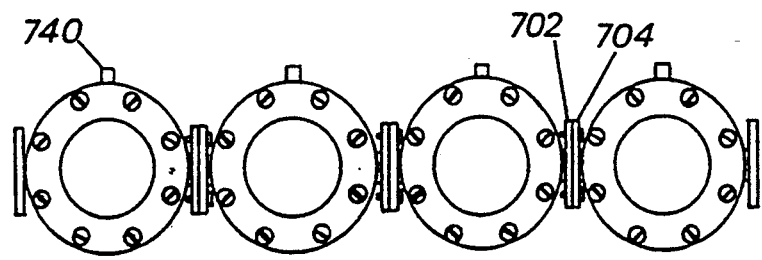
FIG. 18 is a side view of an assembly of four smoke cooling cylinders attached in series by bolted flanges.

The following description makes reference to FIGS. 17 and 18.

FIG. 17 shows the top view and FIG. 18 shows the side view of a series of four smoke cooling cylinders 730, 732, 734, and 736 attached at their smoke outlet and inlet flanges 704 and 702. The outer annular sight glass flange 724 is shown bolted to the flange 714 on the end of the cylindrical inner and outer walls with a Pyrex sight glass 718 sealed between them. This configuration is identical for both ends of each smoke cooling cylinder. The inlet 738 and outlet 740 nozzles for supply of cooling water into the smoke cooling cylinder jackets are depicted in FIG. 17.

Possible variations to the smoke generator design will now be discussed.

The above detailed description referring to FIG. 1 is a description of the innovative process of smoke generation for which patent protection is being sought. As outlined above in the "Disclosure of the Invention" section, the relevant smoke generation parameters that can be controlled and varied by this smoke generation process include:

a. the feed rate of particulated wood to the smoke generator
  b. the pyrolysis temperature for the thermal degradation of wood particles
  c. the hold-up time during which the wood particles are subjected to pyrolysis
  d. the rate of air supply to the partial combustion stage of smoke generation (i.e. the air:fuel ratio)
  e. the temperature of the partial combustion air supply upon delivery to the partial combustion zone
  f. the pyrolysis and partial combustion stages of smoke generation are separated and independently controlled
  g. the concentrated, high temperature smoke gases are cooled by heat exchange rather than by dilution with air or other cool diluting gases.

Following the description of the smoke generation process depicted by FIG. 1, a particular embodiment of this process is described with reference to FIGS. 2 to 18. Minor variations could be made to the physical shape and configurations of some of the elements of this smoke generator to accomplish the same process.

The preferred smoke cooling apparatus described above and by FIGS. 16, 17 and 18 is a series of four cylindrical chambers at the exit of the smoke generator through which the concentrated smoke passes. Each cylinder is jacketed for circulation of cooling water so that the smoke is cooled by heat exchange with the inside cylindrical walls of the smoke cooling cylinders. There are sight glasses at each end of each cylinder to allow viewing of the smoke. The internal volume of each cylinder is about one liter and the inside diameter is about one-half of the inside height of each cylinder.

This particular design for smoke cooling is most appropriate for generating smoke for research purposes. This design is a compromise in geometrical configuration that endeavours to maximize the efficiency of heat exchange between the smoke and the cooled internal metal walls and to minimize the losses of smoke aerosol droplets by collection on the cooled metal walls. Minimizing thermophoretic losses of the smoke aerosols is particularly important when it is desired to perform experimental measurements on smoke aerosol size distributions or chemical composition of the smoke. As a further compromise in the design of the smoke cooling cylinders, the total volume of the cooling system must be minimized to avoid an undesirably long flow through time of smoke in the cooling cylinders.

For a commercial application of this smoke generator, thermophoretic losses of the aerosol phase of smoke are not as great a concern in the smoke cooling stage. The design of the smoke cooling apparatus could be geometrically varied with the main concern being to rapidly and efficiently cool the smoke by mechanical heat exchange as it exits from the smoke generator. The smoke cooling apparatus could take a number of forms. For example, a flat channel formed between two parallel, cooled flat plates could be employed as an efficient heat exchanger for cooling the smoke.

It will be appreciated that the above description relates to the preferred embodiment by way of example only. Many variations on the invention will be obvious to those knowledgeable in the field, and such obvious variations are within the scope of the invention as described and claimed, whether or not expressly described.

INDUSTRIAL APPLICABILITY

The invention provides a smoke generator for use in supplying smoke to food smoking kilns, for use in research applications, and for other uses where controlled generation of smoke may be desired. The facility of this smoke generator to closely control the parameters of smoke generation provides the operator of a commercial food smoking kiln with the ability to consistently generate an optimal smoke at a preselected concentration. The facility to control both the pyrolysis stage of smoke generation and the partial combustion stage of smoke generation in separate chambers of the smoke generator provides the necessary close control over smoke generation parameters. Those knowledgeable in the field will readily appreciate other uses and advantages of the invention.

I claim:

1. A smoke generator comprising an enclosed body having a pyrolysis chamber therein, a fuel supply communicating with said pyrolysis chamber for supplying combustible matter to said pyrolysis chamber, an air supply communicating with said body for supplying air for smoke generation, means for heating said combustible matter in said pyrolysis chamber to pyrolize said combustible matter, and a smoke outlet from said body, communicating with said pyrolysis chamber via a smoke channel, said smoke generated being characterized by:

said fuel supply including means for adjusting the supply of said combustible matter to said pyrolysis chamber to a desired rate;

said air supply being adjustable for supplying said air for said smoke generation at a desired rate.

2. A smoke generator as recited in claim 1, further characterized by said air supply supplying air to said pyrolysis chamber.

3. A smoke generator as recited in claim 1, further characterized by said air supply supplying air to said smoke channel.

4. A smoke generator as recited in claim 1, further characterized by a platform within said pyrolysis chamber for receiving said combustible matter from said fuel supply.

5. A smoke generator as recited in claim 4, further characterized by said platform being rotatable, by said fuel supply means depositing said combustible matter at a first location on said platform, and by ash collection means for collecting ash from said platform at a second location remote from said first location.

6. A smoke generator as recited in claim 4, further characterized by said means for heating including a heating element positioned in said pyrolysis chamber beneath said platform.

7. A smoke generator as recited in claim 5, further characterized by said means for heating including a heating element positioned in said pyrolysis chamber beneath said platform.

8. A smoke generator as recited in claim 1, further characterized by a heat exchanger connected to receive smoke from said smoke outlet, for cooling said smoke.

9. A smoke generator as recited in claim 1, further characterized by said adjustable fuel supply means including a hopper positioned above said body for gravity feeding of said combustible matter.

10. A smoke generator as recited in claim 1, further characterized by means for pre-heating said air from said air supply to a desired temperature.

* * * * *